United States Patent Office 3,062,635
Patented Nov. 6, 1962

3,062,635
METHOD FOR INHIBITING PLANT AND FUNGAL GROWTH
Donald S. Acker, Newark, and William W. Prichard, Hockessin, Del., assignors to E. I. du Pont de Nemours and Company, Wilmington, Del., a corporation of Delaware
No Drawing. Filed July 18, 1958, Ser. No. 749,325
4 Claims. (Cl. 71—2.3)

This invention relates to agricultural chemical compositions and to their use in regulating the growth of plants and in controlling the growth of fungi. More particularly, the invention is directed to plant growth regulating and fungicidal compositions containing arylazomalononitriles.

This application is a continuation-in-part of our copending application Serial No. 679,527, filed August 21, 1957, now abandoned.

Many compounds have been employed in recent years to control or regulate the growth of plants. A large number of the compounds which have been so employed are herbicidal to many species of plants, particularly the broad-leaved weeds, but have little effect upon grasses or other plants. A particularly interesting property has been observed when maleic hydrazide has been applied to grasses. Thus, U.S. 2,614,916 shows that although maleic hydrazide (the reaction product of maleic anhydride and hydrazine) is somewhat phytocidal in relatively large doses, smaller concentrations inhibit temporarily the growth of grasses in lawns.

The newer highways which have large grass plots require the expenditure of considerable time and effort in the maintenance of a good turf. The grass needs to be cut frequently or otherwise prevented from growing too high. Accordingly, there is considerable demand for compositions capable of being rapidly and easily applied to lawn and roadside grasses and which inhibit the rate of growth of the grass but do not kill it, thereby markedly reducing the number of cuttings per season.

Fungal infestations of plants are responsible for large losses to agricultural and horticultural industries. Fungi not only attack seeds to inhibit germination, but also attack leaves of growing plants.

Now we have found that plant growth regulating and fungicidal compositions are obtained by employing as the active ingredient an arylazomalononitrile of the general formula (1)         ArN=NCH(CN)$_2$ wherein Ar is an aromatic radical of up to and including 10 carbons joined by nuclear carbon to azo nitrogen. These compositions effectively inhibit the growth of fungi and plants, including grasses, when the aromatic azomalononitrile is employed in relatively small concentrations. Plant growth inhibition is obtained when the arylazomalononitrile composition is applied to the roots of plants whereas fungal growth is inhibited on leaves when applied to the foliage of plants.

It is preferred that the aromatic radical Ar in the above formula has not more than three nuclear substituents which contain carbon, nitrogen, oxygen, or halogen atoms. Particularly preferred substituents on the aromatic ring are members of the group consisting of alkyl, alkoxy, nitro and halogen radicals. The most preferred arylazomalononitriles are those wherein the aromatic radical is a chlorophenyl group for plant growth inhibition and phenyl, tolyl or chlorophenyl for inhibition of fungi.

The arylazomalononitriles of our novel compositions are acidic (pK about 6.6). As will be discussed more fully hereinafter, they can be dissolved in sodium bicarbonate and applied in aqueous solution. Accordingly, isomers of ArN=NCH(CN)$_2$, as shown in the following equation, may represent the probable contributing structures:

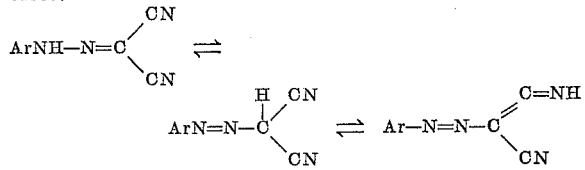

However, for the purposes of this invention, the active compounds of our compositions are referred to herein as arylazomalononitriles although they may exist as the arylhydrazones of carbonyl cyanide.

The aromatic azomalononitriles represented by the above formulas are readily prepared by the method described by Schmidtmann, Ber., 29, 1174, as well as by Todd et al., J. Chem. Soc., 1944, 315.

All compounds having the formula

have plant growth regulant and fungicidal properties wherein the Ar is an aromatic group attached through nuclear carbon of aromatic ring to azo nitrogen. Some are, as will be seen from the tabulated examples which follow, more active than others. This is particularly true for m-chlorophenylazomalononitrile and the polychlorinated azomalononitriles which have unusually high growth and fungal inhibition properties. In addition to the chlorine-containing compounds, the corresponding bromine and fluorine-containing compounds, such as, for instance, p-bromophenylazomalononitrile, m-fluorophenylazomalononitrile, 2,5 - dibromophenylazomalononitrile and the like, have plant growth and fungal inhibiting properties.

One method of applying chemicals to plant foliage and roots has been to dissolve them in solvents that are cheap and inert. For some compounds, water is a preferred diluent since it is readily available. For compounds that are insoluble in water, they can be dispersed in the form of small particles by surface-active agents.

Arylazomalononitriles are generally rather insoluble in water and only a few give a sufficiently high concentration in water to exhibit herbicidal effects. Organic solvents would ordinarily be the system of choice for application of organic chemicals to plants. However, as pointed out above, the arylazomalononitriles represented by Formula 1 can be dissolved in water to which an alkali metal bicarbonate or similar basic composition has been added. Accordingly, the use of sodium or potassium salts of the arylazomalononitriles is generally preferred for application to plants. This property of dissolving in aqueous basic media increases the superiority of the aromatic azomalononitriles for practical uses.

It will be understood that the present invention involves both formulations containing the aromatic azomalononitriles and their application to plant roots to obtain inhibition or regulation of growth, especially of turf or lawn grasses, as well as application to foliage or even seed to control fungal growth. The direct application of an azomalononitrile in the absence of carrier material to a growing plant would in general supply an exceedingly high and costly dosage to the plant with possible local herbicidal effects. Accordingly, the aromatic azomalononitriles are formulated by mixture with a conventional carrier material or conditioning agent of the kind used and commonly referred to in the art as a fungicidal or herbicidal adjuvant (or modifier) to provide a composition for ready and efficient application, by use of conventional applicator equipment, to areas in which it is desired to exert inhibitory or fungicidal action. Formulations using adjuvants are obtained, such as described in U.S. Patents 2,655,444 through 2,655,447.

Any of the adjuvants, including dusts, solvents, wetting, dispersing and emulsifying agents set out in U.S. Patent 2,426,417, can be employed in preparing the compositions of the present invention. Other wetting, dispersing and emulsifying agents, such as those listed in detail in Bulletin E607 of the Bureau of Entomology and Plant Quarantine of the U.S. Department of Agriculture and such as those set out in an article by McCutcheon in "Soap and Chemical Specialties," July through September 1955, entitled "Synthetic Detergents and Emulsifiers," can be used in compositions of this invention. It will be understood that the surface-active agents which are employed can be of the anionic, cationic or nonionic type. They include, for example, sodium oleate, sulfonated petroleum oils, alkyl aryl sulfonates, sodium lauryl sulfate, polyethylene oxides, lignin sulfonates and the like.

The aromatic azomalononitriles are of sufficient solubility in water by themselves or with added alkali metal bicarbonate or base to form the desired concentration in water solution for spraying onto plant foliage for antifungal activity or on the ground for root absorption for plant regulant activity. They can be employed in the form of water-dispersible powders. The latter are obtained by admixing one or more of the active compounds with a surface-active agent and optionally a finely divided solid carrier such as talc, diatomaceous earth, or clay. The surface-active agents are used in amount sufficient to impart water dispersibility to the powder.

Dust compositions can, of course, be prepared by admixing one or more of the aromatic azomalononitriles with a finely divided carrier. Liquid compositions, however, are more readily handled, and the dosage generally is easier to regulate.

For plant regulant effect, the compositions of the present invention are applied to the roots of plants in the locus or area wherein plant growth is to be inhibited or regulated, in amounts sufficient to exert the desired action. The dosage is dependent upon the particular active ingredients, the nature of formulation used, the type of treatment and vegetation to be regulated, climatic conditions, and the like.

In general, when the compositions are applied as an aqueous spray for absorption by the roots, a dosage of over 20 pounds per acre; for example, 20–60 pounds of the arylazomalononitriles, strongly inhibits the rate of growth of grassy plants, and also exerts some herbicidal action on broad-leaved plants, such as wild mustard, dandelion, lamb's-quarters, rough pigweed, and plantain.

In a particularly preferred embodiment of the invention, namely, the application of the aromatic azomalononitrile to lawns or turf for the purpose of limiting the number of mowings required per season without killing the grass, lower quantities of the active compound are employed for root application, such as for example, 0.1 to 5 pounds per acre. Not only is the rate of growth of the grasses reduced, but the arylazomalononitriles decrease the loss of water.

This invention, generically, consists in the treatment of vegetation with arylazomalononitriles. It has been found that when the foliage only is treated with these compounds, substantially no absorption and translocation takes place as shown by the lack of growth inhibitory effects. The major result of such application to the plant is inhibition or prevention of growth of fungi. Application to the roots or absorption by the roots of an arylazomalononitrile, however, results in reduction in the rate of growth of the plant. Fungicidal activity is also obtained by treatment of soil and of seeds. The compositions also exert nematocidal action in doses of about 100 lbs. per acre.

The following examples are submitted to illustrate, but not to limit, the plant regulant compositions of the invention and their effect upon plants:

EXAMPLE I

Kentucky bluegrass, grown in sand culture, was cut off one inch above the surface of the sand. Test plants were watered with sufficient 25 p.p.m. solution of m-chlorophenylazomalononitrile to give a concentration of 2 lb./acre, while controls received an equivalent amount of the water. Both sets were watered daily with a nutrient solution and allowed to grow under controlled conditions. After 17 days, the grass was again cut to a height of one inch, and the dry weight of the new growth determined. The weight of new growth of the treated plants was only 8% of that of the controls, yet the plants were a bright green color and appeared to be healthy.

EXAMPLE II

Three varieties of plants were used to test the effect of a series of arylazomalononitriles on plant growth. These were a small member of the pink family, *Dianthus deltoides,* a member of the mustard family, *Arabidopsis thaliana,* and a grass, *Elusine indica.* The plants were grown under carefully controlled conditions of light, temperature, and humidity in sand culture, using an inorganic nutrient medium. Plants of uniform size were selected and divided into groups of four. Solutions of the chemicals to be tested were applied to the roots of the plants. In each experiment, four control plants received water in place of the chemical solution. After a single treatment, plants were watered daily with an inorganic nutrient solution so that part of the preceding day's solution was washed through holes in the pots. After completion of the test period (3–4 weeks) the plants were dried and the dry weights determined. The results of treatment with various arylazomalononitriles are summarized in Table I.

*Table I*

EFFECT ON GROWTH OF PLANTS

| Arylazomalononitrile | Dianthus deltoides | | Elusine indica | | Arabidopsis thaliana | |
|---|---|---|---|---|---|---|
| | Rate (lbs./acre) | Growth as percent of Control | Rate (lbs./acre) | Growth as percent of Control | Rate (lbs./acre) | Growth as percent of Control |
| phenyl | 1.0 | 36 | 0.2 | 33 | 1.0 | 35 |
| | | | 1.0 | 10 | | |
| o-chlorophenyl | 1.0 | 0 (killed) | 0.2 | 45 | 1.0 | 34 |
| | | | 1.0 | 29 | | |
| m-chlorophenyl | 1.0 | 0 (killed) | 0.2 | 47 | 1.0 | 5 |
| | | | 1.0 | 0 (killed) | | |
| p-chlorophenyl | 1.0 | 0 (killed) | 0.2 | 15 | 1.0 | 17 |
| | | | 1.0 | 19 | | |
| 2,5-dichlorophenyl | | | 0.2 | 49 | 1.0 | 3 |
| | | | 1.0 | 32 | | |
| 3,4-dichlorophenyl | | | 0.2 | 58 | 1.0 | 20 |
| | | | 1.0 | 22 | | |
| 2,4-dichlorophenyl | | | 0.2 | 13 | 1.0 | 4 |
| | | | 1.0 | 30 | | |

*Table I*—Continued

EFFECT ON GROWTH PLANTS—Continued

| Arylazomalononitrile | Dianthus deltoides | | Elusine indica | | Arabidopsis thaliana | |
|---|---|---|---|---|---|---|
| | Rate (lbs./ acre) | Growth as percent of Control | Rate (lbs./ acre) | Growth as percent of Control | Rate (lbs./ acre) | Growth as percent of Control |
| p-methoxyphenyl- | 1.0 | 0 (killed) | 0.2 | 75 | 1.0 | 33 |
| | | | 1.0 | 79 | | |
| m-nitrophenyl- | 1.0 | 28 | 1.0 | 23 | 1.0 | 78 |
| o-tolyl | 1.0 | 28 | 1.0 | 26 | | |
| m-tolyl | 1.0 | 25 | 1.0 | 24 | | |
| p-tolyl | 1.0 | 35 | 1.0 | 45 | | |
| p-carboxyphenyl | | | 20.0 | 45 | | |
| beta-naphthyl | 1.0 | 32 | 1.0 | 43 | 1.0 | 44 |
| p-sulfonamido | 1.0 | 79 | | | | |
| | 2.0 | 57 | | | | |
| p-acetylphenyl | | | 1.0 | 79 | | |

EXAMPLE III

The general procedure of Example II was repeated using two plants, *Arabidopsis thaliana* and wire grass. The following table (Table II) shows the superiority, as a growth inhibitor, of the arylazomalononitriles compared to malononitrile, a known herbicide described in U.S. 2,683,659:

*Table II*

| Compound | Plant | Application Rate (lbs./ Acre) | Growth as percent of Control |
|---|---|---|---|
| m-chlorophenylazomalononitrile | A.t. | 2 | 22 |
| Do | A.t. | 4 | 25 |
| Do | W.g. | 2 | 4.5 |
| Do | W.g. | 4 | 2.9 |
| Malononitrile | A.t. | 2 | 86 |
| Do | A.t. | 4 | 70 |
| Do | W.g. | 2 | 80 |
| Do | W.g. | 4 | 70 |

(NOTE.—A.t.=*Arabidopsis thaliana*, W.g.=wire grass.)

EXAMPLE IV

The general procedure of Example I was repeated except that the grass was wire grass and the rate of application of p-chlorophenylazomalononitrile was 1 lb./acre. The azomalononitrile inhibited the growth of grass for at least six weeks after a single application. In contrast to this, when p-chlorophenylazocyanoacetic ester was employed, only a slight inhibitory effect was observed.

The preceding examples show that plant regulant activity for the azo compounds requires the N=NCH(CN)$_2$ grouping. Furthermore, the compounds are generally more active or can be employed in much lower concentrations than conventional grass growth retardants.

EXAMPLE V

A composition was prepared by pulverizing the following ingredients until a finely divided mixture was obtained:

| | Percent |
|---|---|
| p-Methylphenylazomalononitrile | 50 |
| Polyoxyethylene ester of mixed fatty and resin acids ("Ethofat 242/60") | 3 |
| Silica | 47 |

The composition was extended by water to form a dispersion that contained 1% of the azomalononitrile. The dispersion was sprayed on the foliage of young cotton plants and on the soil in which the plants were growing. After two weeks, the rate of growth was observed to have been markedly retarded with substantially no leaf injury.

EXAMPLE VI

The following ingredients were thoroughly mixed together:

| | Percent |
|---|---|
| 2,5-dichlorophenylazomalononitrile | 75 |
| Sodium alkylnaphthalene sulfonic acid ("Alkanol B") | 0.75 |
| Methyl cellulose | 0.25 |
| Fine silica | 24 |

The above mixture was dispersed in water to give a composition having a concentration of azamalononitrile of 1%. This was sprayed on cotton plants. After two weeks, growth was retarded as compared to untreated plants.

EXAMPLE VII

The effectiveness of the arylazomalononitriles against the early tomato blight fungus (*Alternaria solani*) was ascertained by application of the compounds in water as the diluent to tomato foliage. Table III shows that the compounds protected tomato plant foliage to extents of 72–100% at concentration of 0.2%. At dilutions of less than one hundredth of this value many of the compounds were quite effective.

*Table III*

| Arylazomalononitrile | Percent Control at Concentration of— | |
|---|---|---|
| | 0.2% | 0.0016% |
| Phenyl | 100 | 86 |
| m-chlorophenyl | 100 | 12 |
| 2,5-dichlorophenyl | 100 | |
| m-tolyl | 100 | 80 |
| p-tolyl | 100 | 85 |
| p-acetamidophenyl | 72 | |
| p-sulfonamidophenyl | 96 | |
| o-tolyl | 100 | 42 |
| p-acetylphenyl | 98 | 32 |

EXAMPLE VIII

When applied to apple foliage at a concentration of 0.008%, the foliage was protected against the apple scab fungus (*Venturia inaequalis*) as shown by Table IV.

*Table IV*

| Arylazomalononitrile: | Percent control |
|---|---|
| Phenyl | 100 |
| m-Chlorophenyl | 97 |
| 2,5-dichlorophenyl | 98 |
| m-Tolyl | 100 |
| p-Tolyl | 98 |
| p-Acetamidophenyl | 96 |
| p-Sulfonamidophenyl | 90 |
| o-Tolyl | 98 |
| p-Acetylphenyl | 98 |

In contrast to the above results, when ethyl (m-chlorophenylazo) malononitrile was used, no fungicidal action was observed.

The embodiments of the invention in which an exclusive property or privilege is claimed are defined as follows.

We claim:

1. The method which comprises treating growing plants with an arylazomalononitrile having the formula $$ArN=NCH(CN)_2$$

wherein Ar is an aromatic radical of from 6 to 10 carbon atoms, said radical being attached through nuclear carbon of the aromatic ring to azo nitrogen, in an amount at least sufficient to inhibit the growth characteristics of fungi infesting said plants and of the plants themselves.

2. A method for inhibiting the growth of plants which comprises applying to the roots of said plants, in an amount at least sufficient to inhibit plant growth, an arylazomalononitrole having the formula $$ArN=NCH(CN)_2$$

wherein Ar is an aromatic radical of from 6 to 10 carbon atoms, said radical being attached through nuclear carbon of the aromatic ring to azo nitrogen.

3. A method for controlling fungal growth on plants which comprises applying to the foliage of said plants, in an amount at least sufficient to inhibit fungal growth, an arylazomalononitrile having the formula $$ArN=NCH(CN)_2$$

wherein Ar is an aromatic radical of from 6 to 10 carbon atoms, said radical being attached through nuclear carbon of the aromatic ring to azo nitrogen.

4. A method for inhibiting fungal attack of seeds, which comprises applying to said seeds in an amount at least sufficient to control fungal growth, an arylazomalononitrile having the formula $$ArN=NCH(CN)_2$$

wherein Ar is an aromatic radical of from 6 to 10 carbon atoms, said radical being attached through nuclear carbon of the aromatic ring to azo nitrogen.

References Cited in the file of this patent

UNITED STATES PATENTS

| | | |
|---|---|---|
| 2,658,889 | Goldberg et al. | Nov. 10, 1953 |
| 2,683,659 | Schlesinger et al. | July 13, 1954 |
| 2,758,050 | Hackmann | Aug. 17, 1956 |